(12) United States Patent
Chang (10) Patent No.: US 9,580,892 B2
(45) Date of Patent: Feb. 28, 2017

(54) FAUCET WITHOUT COMPARTMENTS

(71) Applicant: Chia-Po Chang, Changhua (TW)

(72) Inventor: Chia-Po Chang, Changhua (TW)

(73) Assignee: Hain Yo Enterprise Co. Ltd., Changhua (TW)

( * ) Notice: Subject to any disclaimer, the term of this patent is extended or adjusted under 35 U.S.C. 154(b) by 5 days.

(21) Appl. No.: 14/628,992

(22) Filed: Feb. 23, 2015

(65) Prior Publication Data

US 2016/0017578 A1 Jan. 21, 2016

(30) Foreign Application Priority Data

Jul. 17, 2014 (TW) .............................. 103212805 U (51) Int. Cl.
*E03C 1/04* (2006.01)
*F16K 31/60* (2006.01)
*F16K 11/074* (2006.01)

(52) U.S. Cl.
CPC ................ *E03C 1/04* (2013.01); *F16K 11/074* (2013.01); *Y10T 137/86815* (2015.04); *Y10T 137/86823* (2015.04)

(58) Field of Classification Search
CPC ...... F16K 11/074; F16K 11/0787; E03C 1/04; Y10T 137/86815; Y10T 137/86823
See application file for complete search history.

(56) References Cited

U.S. PATENT DOCUMENTS

| | | | | |
|---|---|---|---|---|
| 2,864,398 A * | 12/1958 | Green | ................. | F16K 11/0565 137/327 |
| 3,625,255 A * | 12/1971 | Genin | ................... | F16K 11/202 137/607 |
| 4,540,023 A * | 9/1985 | Pawelzik | ............ | F16K 11/0787 137/625.17 |
| 5,368,071 A * | 11/1994 | Hsieh | ........................ | E03C 1/04 137/625.17 |
| 5,701,934 A * | 12/1997 | Kuran | ..................... | E03C 1/023 137/625.46 |
| 6,202,686 B1 * | 3/2001 | Pitsch | ........................ | E03C 1/04 137/359 |
| 7,556,061 B2 * | 7/2009 | Morita | ....................... | E03C 1/04 137/625.17 |
| 7,798,172 B2 * | 9/2010 | Leutwyler | ................. | E03C 1/04 137/625.41 |

(Continued)

*Primary Examiner* — Craig Schneider
*Assistant Examiner* — Kevin Barss
(74) *Attorney, Agent, or Firm* — Che-Yang Chen; Law Offices of Scott Warmuth (57) ABSTRACT

A faucet body without compartment is disclosed. The faucet body is casted and forged integrally with an upright tubular shell, and the upper portion of shell comprises a thread segment. A first annular convex and a second annular convex are formed at a lower portion of the thread segment, and a flow space is formed between the first annular convex and the second annular convex. Below the second annular convex, At least a first bearing base, a second bearing base and a support block extend from the second annular convex. The first bearing base, second bearing base and support block are connected by a protruding shoulder to support the fined ceramic valve in the faucet body. An outlet conduit extends forward from a periphery of top of the shell, and an outlet channel is formed inside the outlet conduit to connect to the flow space of the shell.

13 Claims, 9 Drawing Sheets

(56) References Cited

U.S. PATENT DOCUMENTS

| | | | | |
|---|---|---|---|---|
| 7,819,137 B2* | 10/2010 | Nelson | ............... | E03C 1/04 137/625.4 |
| 7,909,062 B2* | 3/2011 | Chen | ............... | E03C 1/04 137/801 |
| 8,181,886 B2* | 5/2012 | Li | ............... | F16K 11/0743 236/12.18 |

* cited by examiner

FAUCET WITHOUT COMPARTMENTS

FIELD OF THE INVENTION

The present invention relates to a faucet without compartments inside. In particular, the faucet in the present invention does not have preset-compartments in the manufacturing process.

BACKGROUND OF THE INVENTION

Figure 14:
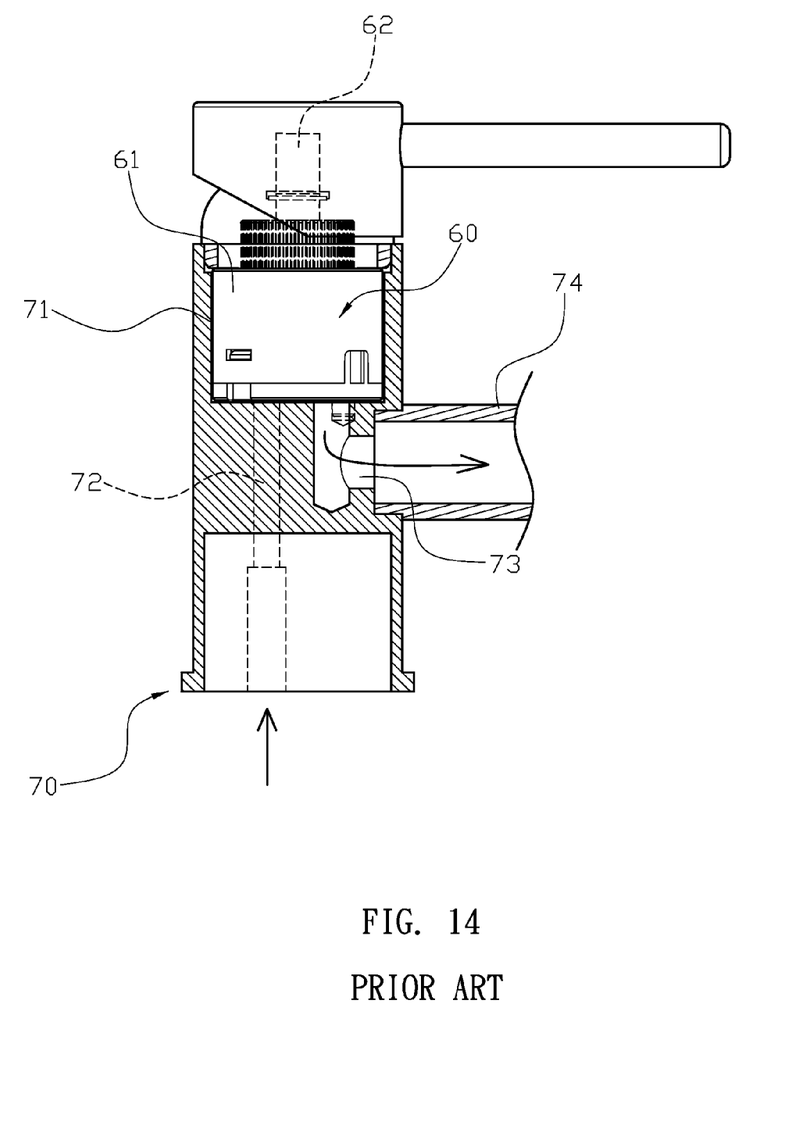
FIG. 14 is a prior art illustrating a faucet with compartments.

The faucet structure used to have a fined ceramic valve inside for controlling the water flow opening and closing and the amount of water. The fined ceramic valve (60) used to install a valve stem (62), an upper ceramic piece and a lower ceramic piece inside the valve casting (61) and the free end of the fined ceramic valve (60) connects to a valve base. The fined ceramic valve is settled into the compartment (71) of the faucet body (70) which is preset in manufacturing process. The hot water and the cold water flows upward into the faucet by a cold/hot water inlet tube (72) which penetrates through the compartment (as shown in FIG. 14). When the faucet is in use, the valve stem, which extends from valve casting, enable the handle of faucet body (70) to rotate after the handle is pulled up, so that the valve stem (62) can make the limber hole on upper ceramic piece to align with the drain hole on lower ceramic piece. And then the cold water and the hot water can flow into the fined ceramic valve (60) and be mixed before the mixed water runs through the limber hole in valve base and flows out from the drain hole (73) which is on the bottom of compartment (71) in the faucet body (70). Conversely, pull down the handle of faucet body (70) causes the limber hole on upper ceramic piece to misalign with the drain hole on lower ceramic piece, so that the faucet is in off position and the water flow is blocked.

However, conventional structure described above still has some problems to apply to the practical application and there are some concerns below: (i) Because of the drain hole (73) in the compartment (71) can only be penetrated outward from the bottom of the compartment, the design of faucet body (70) is limited by the presence of compartment (71). In this embodiment, the height of the outlet channel (74) of faucet body (70) is requested to lower. Therefore, when the faucet body (70) is used in a wash-basin or similarly reserved tanks, the reserved tank is hard to be clean because of the lower height of the faucet body (70); and (ii) After the casting process of faucet body (70), the other two more processes are requested for casting the cold/hot inlet tube (72) and the drain hole (73). It cause the overall production process is various and many, and the manufacture cost is higher. Under this circumstance, the device will be not competitive and unable to maintain the technical advantage.

Therefore, there remains a need for a new and improved design for a fined ceramic valve of faucet to overcome the problems presented above.

SUMMARY OF THE INVENTION

According to the problems above, the design of conventional faucet body is limited by the presence of the compartments, so that the drain hole in the compartment can only be penetrated outward from the bottom of the compartment. Under such circumstances, the height of the outlet channel of faucet body has to be lowered. Therefore, when the faucet body is used in a wash-basin or similarly reserved tanks, the reserved tank is hard to be cleaned because the height of the faucet body is low.

The present invention relates to a faucet body without compartments. The faucet body has a fined ceramic valve, which is operated by a handle, for controlling the water flow. The faucet body is casted and forged integrally with an upright tubular shell, and an upper portion of shell comprises a thread segment. A first annular convex and a second annular convex are formed at a lower portion of the thread segment, and a flow space is formed between the first annular convex and the second annular convex. Below the second annular convex, there are at least a first bearing base, a second bearing base and a support block which are extended from the second annular convex. The first bearing base, the second bearing base and the support block are connected by a protruding shoulder. On each top of the first bearing base and the second bearing has a locating hole. Combining the design of the first bearing base, the second bearing base, the support block and the protruding shoulder, the fined ceramic valve can be set and loaded steadily in the faucet body. It extends forward an outlet conduit from the periphery of top of shell, and the inside of the outlet conduit is an outlet channel which can connected to the flow space of shell to form a water current. The fined ceramic valve comprises a valve base, and the bottom of the valve base sets a cold water inlet hole and a hot water inlet hole which can connect to a cold/hot inlet water conduit. There are at least two positioning pins which are settled beside the cold water inlet hole and the hot water inlet hole. When the fined ceramic valve is put into the shell of the faucet body, the positioning pins of the valve base will connect to the positioning hole which is in the shell of the faucet body. In this embodiment, the fined ceramic valve can be fixed in the faucet body. Besides, the fastener in the valve base has a lower ceramic piece and an upper ceramic piece which is controlled by the valve stem. A drain hole is formed on a periphery of the valve base, and ring grooves are formed on an upper portion and lower portion of the drain hole, and a gasket is disposed on the ring groove, so that the kind of faucet body without compartment is formed.

Comparing with conventional faucet structure, the present invention is advantageous because (i) the manufacturing process of the faucet body is not required to reserve the space for compartment. With the fined ceramic valve can drain water out from the side of the faucet, the outlet conduit can be set on the periphery of top of shell. Therefore, when the faucet is used in the wash-basin or similarly reserved tanks, the problem, which is the reserved tank is hard to be clean because of the lower height of the faucet body, can be solved. (ii) Because the faucet body is no compartment, the design is no required to have additional manufacturing process for the cold water inlet hole, the hot water inlet hole and the drain hole after the faucet body is forged or casted integrally. So that the design has the potential for lower processing costs and steps. (iii) With the design of protruding shoulder, which provides more contact area with the fined ceramic valve, in the faucet body, the fined ceramic valve can be set and loaded in the faucet body more steadily.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed in the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a faucet body (10) with a fined ceramic valve (20), which is operated by a handle (30), for controlling the water flow. The faucet body (10) is casted and forged integrally with an upright tubular shell (11), and an upper portion of shell comprises a thread segment (111). A first annular convex (112) and a second annular convex (113) are formed sequentially at a lower portion of the thread segment (111), and a flow space (114) is formed between the first annular convex (112) and the second annular convex (113). Below the second annular convex (113), there are at least a first bearing base (115), a second bearing base (116) and a support block (117) which are extending from the second annular convex (113). The first bearing base (115), the second bearing base (116) and the support block (117) are connected by a protruding shoulder (118). The first bearing base (115) and the second bearing (116) each has a locating hole (119) on a top portion thereof. Combining the design of the first bearing base (115), the second bearing base (116), the support block (117) and the protruding shoulder (118), a fined ceramic valve (20) can be set and loaded steadily in the faucet body (10). An outlet conduit (12) extends forward from the periphery of top of the shell (11), and the inside of the outlet conduit (12) is an outlet channel (121) which can connected to the flow space (114) of the shell (11) to form a water current. The fined ceramic valve (20) comprises a valve base (21), and the bottom of the valve base sets a cold water inlet hole (211) and a hot water inlet hole (212) which can connect to a cold/hot water inlet conduit (40). There are at least two positioning pins (213) which are settled beside the cold water inlet hole (211) and the hot water inlet hole (212). When the fined ceramic valve (20) is put into the shell (11) of the faucet body (10), the positioning pins (213) of valve base (21) will connect to the positioning hole (119) which is in the shell (11) of the faucet body (10). In this embodiment, the fined ceramic valve (20) can be fixed in the faucet body (10). Besides, the fastener in the valve base (21) has a lower ceramic piece and an upper ceramic piece which is controlled by the valve stem (22). A drain hole (214) is formed on a periphery of the valve base, and ring grooves are formed on an upper portion and lower portion of the drain hole, and a gasket (23) is disposed on the ring groove.

Figure 1:
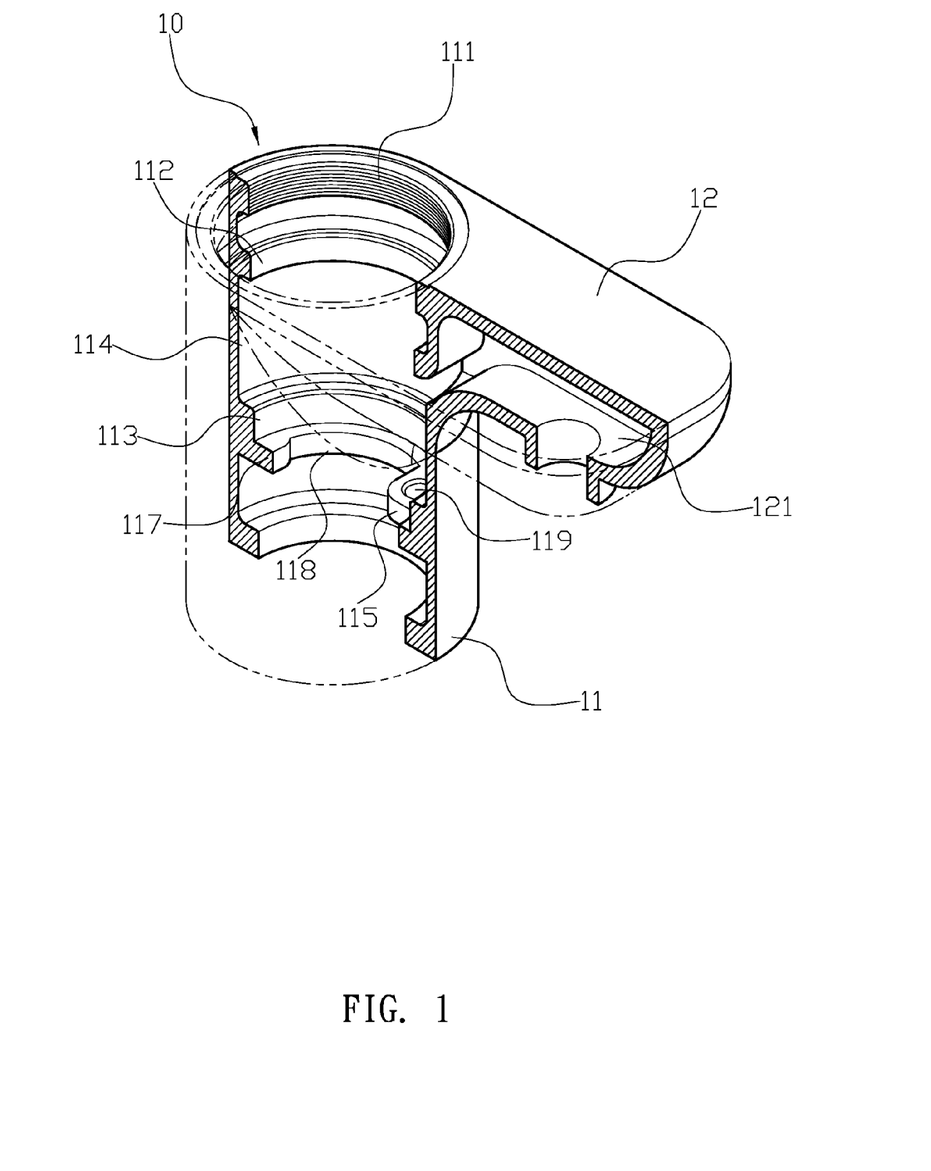
FIG. 1 is a three-dimensional, half sectional view of the faucet body in the present invention.
Figure 2:
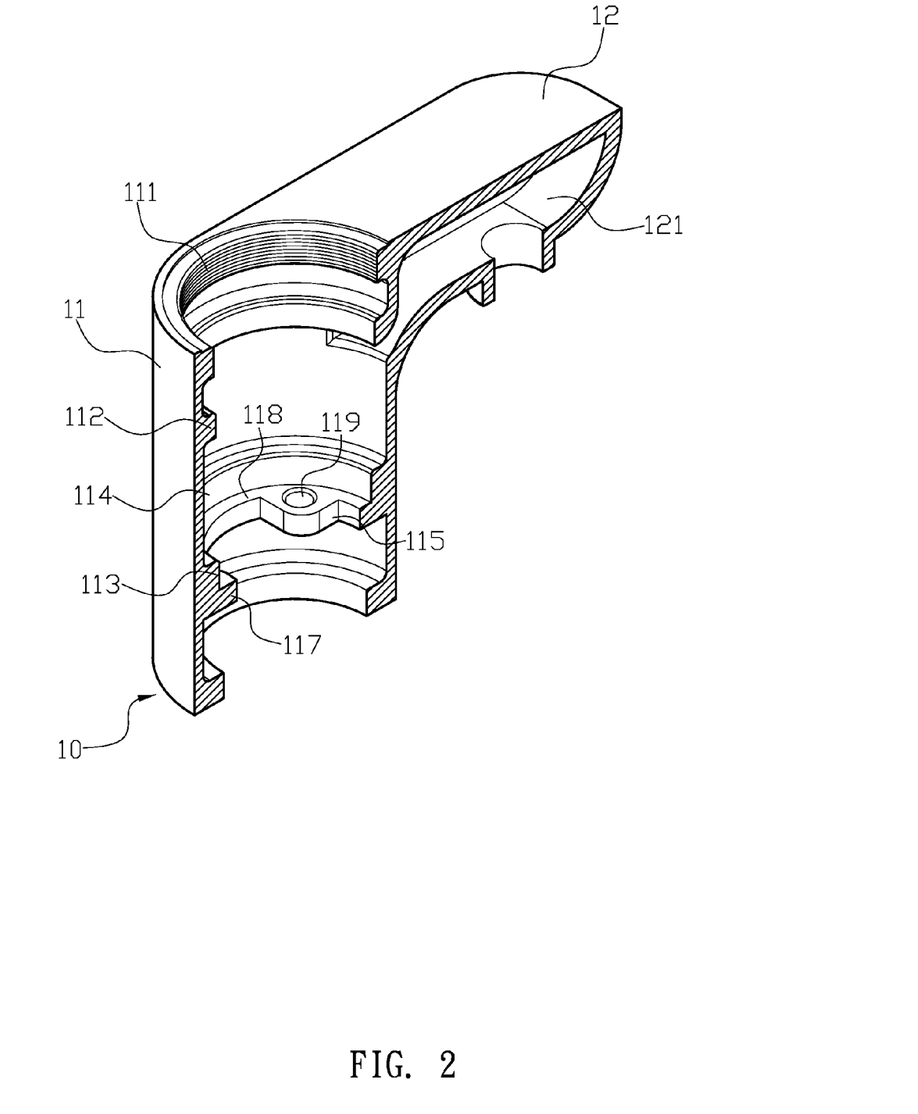
FIG. 2 is a three-dimensional, half sectional view from another angle of the faucet body in the present invention.
Figure 3:
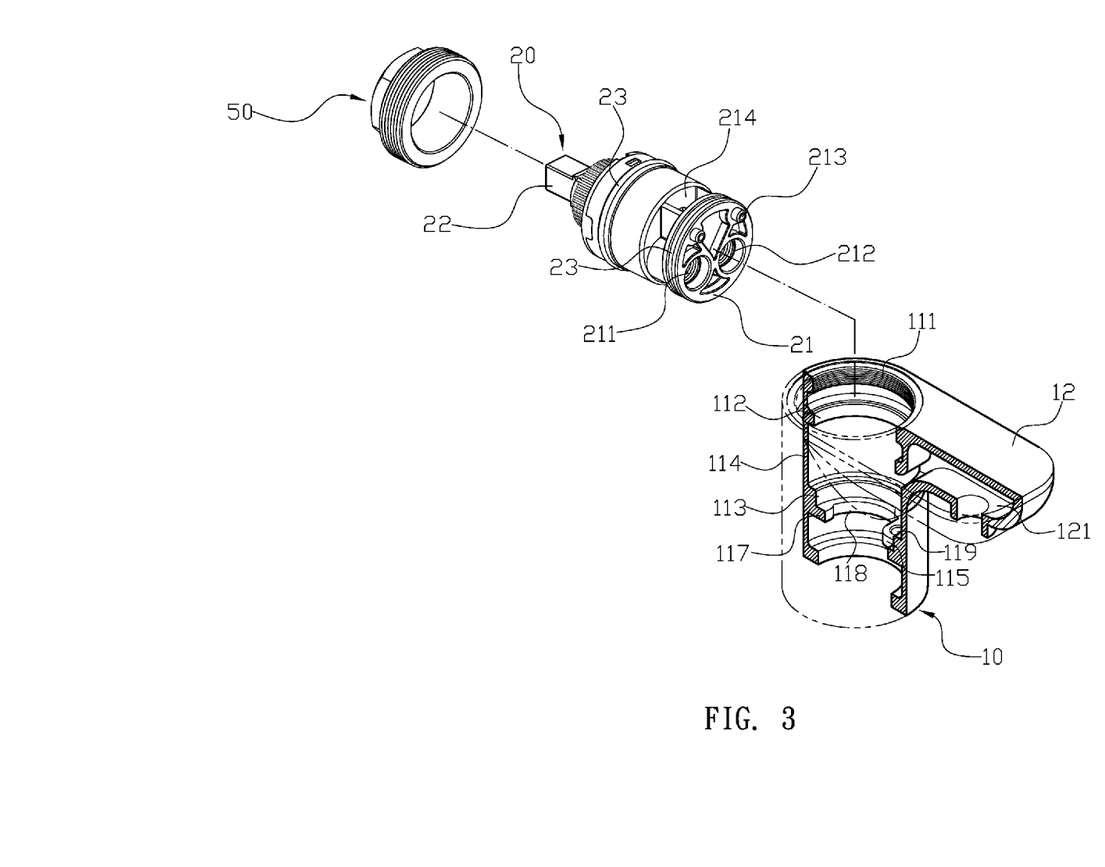
FIG. 3 is a three-dimensional, exploded view of the faucet body in the present invention used with fined ceramic valve.
Figure 4:
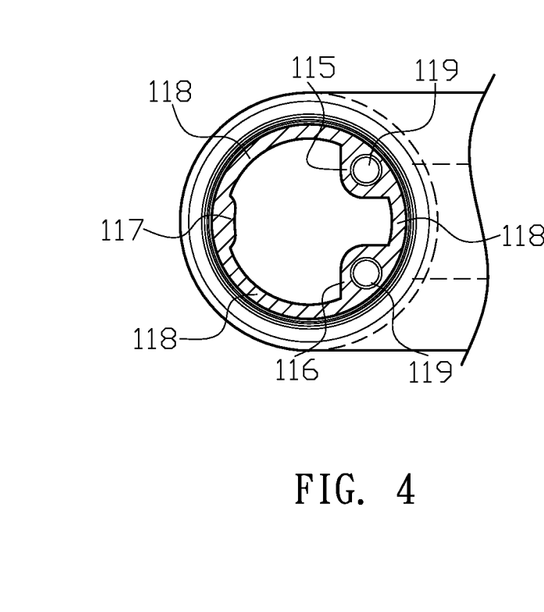
FIG. 4 is a sectional view 1 of the faucet body in the present invention.
Figure 5:
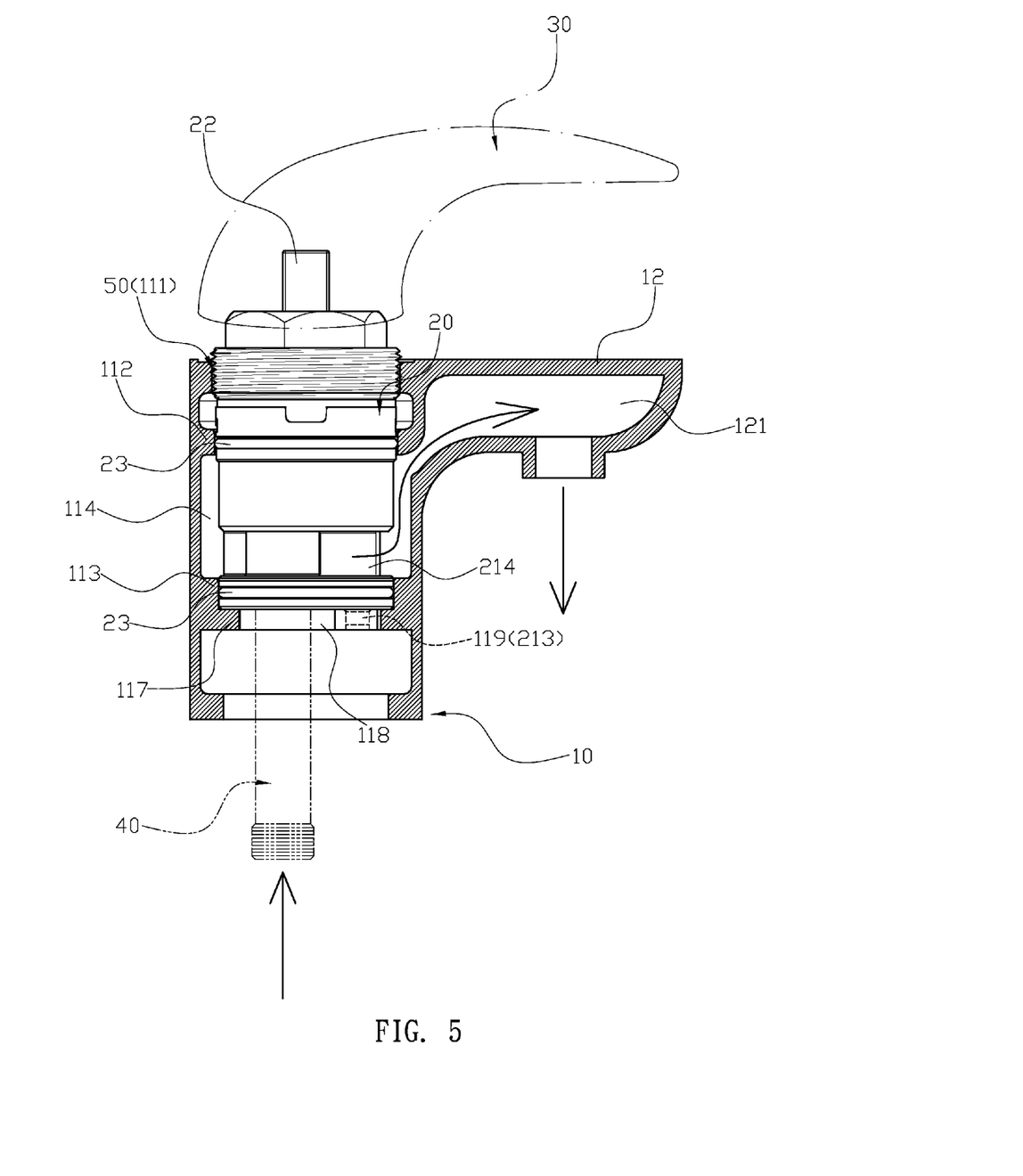
FIG. 5 is a schematic view of the faucet body with fined ceramic valve in use in the present invention.

Referring to FIG. 5, the present invention relates to a structure of faucet, which enables the fined ceramic valve (20) to put into the shell (11) of the faucet body (10), wherein the positioning pin (213) of the fined ceramic valve (20) can connect precisely to the positioning hole (119) in the shell (11) of the faucet body (20), wherein positioning pin (213) can be loaded steadily by the first bearing base (115), the second bearing base (116), the support block (117) and the protruding shoulder (118), wherein the upper and lower gasket (23) in the fined ceramic valve (20) connect to the first annular convex (112) and the second annular convex (113) to form a sealed state and avoid the water leaking from the upper and lower portion of the flow space (114) simultaneously. By the design of using a screw nut (50) onto the thread segment (111) of the faucet body (10), the position of the fined ceramic valve (20) in the faucet body (20) can be controlled when the pressure is provided by the handle (30), so that the handle (30) can control the amount of water when it connects to the valve stem (22) in the faucet body (20).

In actual application, when the handle (30) is rotated, the valve stem (22) which connect to the handle (30) can drive the upper ceramic piece rotate above the lower ceramic piece, so that the mixing chamber in the upper ceramic piece misaligns to a cold/hot water inlet hole of the lower ceramic piece, wherein the mixing ratio of the cold and the hot water can be adjusted by controlling the relative positions between the upper ceramic piece and the lower ceramic piece. The hot and the cold water flow into the faucet from a cold/hot water inlet conduit (40) through the cold water inlet hole (211), the hot water inlet hole (212) and the cold/hot water inlet hole of lower ceramic piece into the mixing chamber in the upper ceramic piece, wherein the cold water and the hot water can be mixed in mixing chamber and drain out from the drain hole of the lower ceramic piece and the drain hole (214) around the side of the fined ceramic valve (20), further, the mixing water can be conducted by the flow space (114)

and the outlet channel (121) of the faucet body (10) and be drained out of the faucet form the outlet conduit (12).

Figure 6:
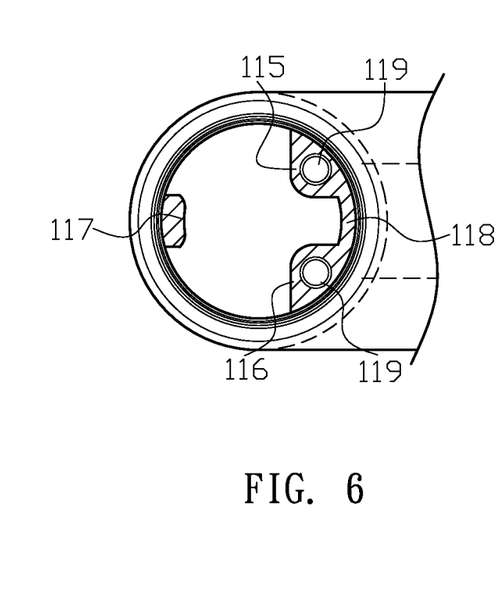
FIG. 6 is the second sectional view of the faucet body in the present invention.
Figure 7:
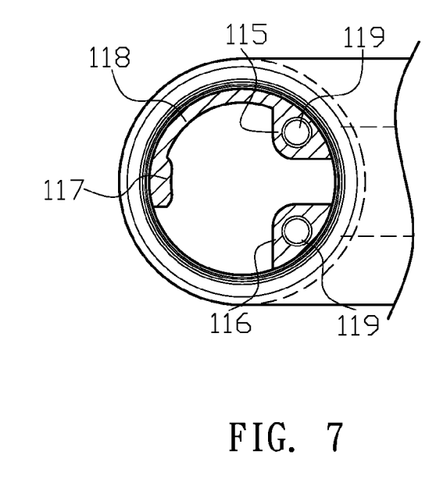
FIG. 7 is the third sectional view of the faucet body in the present invention.
Figure 8:
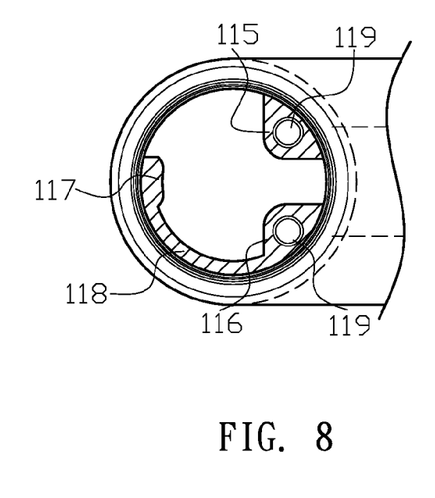
FIG. 8 is the fourth sectional view of the faucet body in the present invention.
Figure 9:
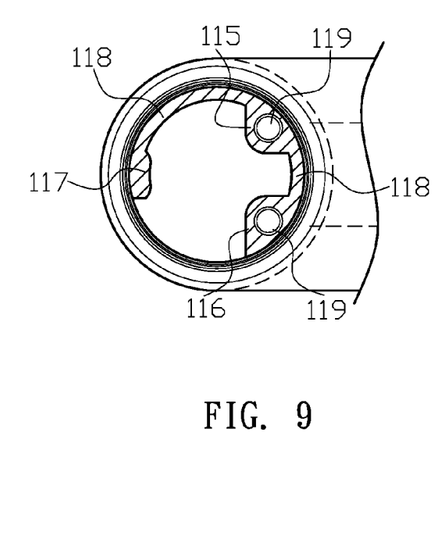
FIG. 9 is the fifth sectional view of the faucet body in the present invention.
Figure 10:
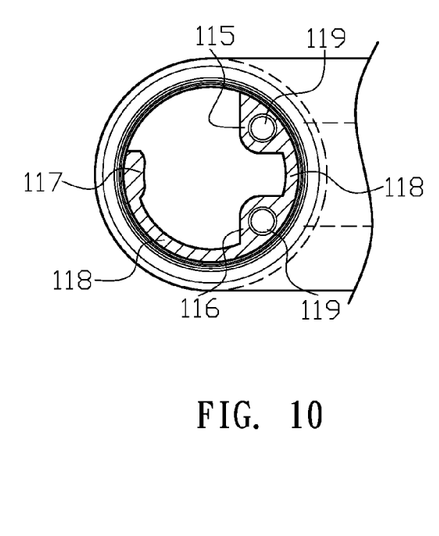
FIG. 10 is the sixth sectional view of the faucet body in the present invention.
Figure 11:
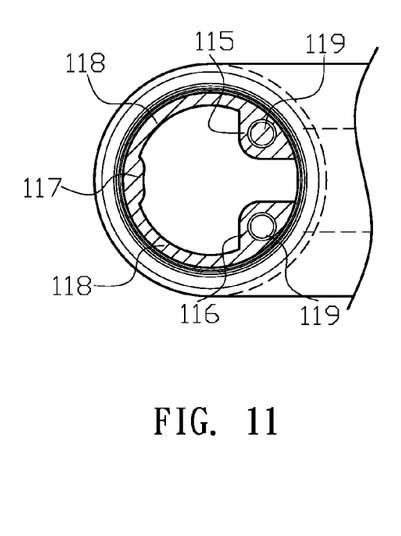
FIG. 11 is the seventh sectional view of the faucet body in the present invention.

The present invention relates to a structure of the faucet body without compartment. In this structure, the protruding shoulder (118) is also functional by only connecting between the first bearing base (115) and the second bearing base (116) (referring to FIG. 6), between the first bearing base (115) and the support block (117) (referring to FIG. 7), or between the second bearing base (116) and the support block (117) (referring to FIG. 8).

Figures 12, 13:
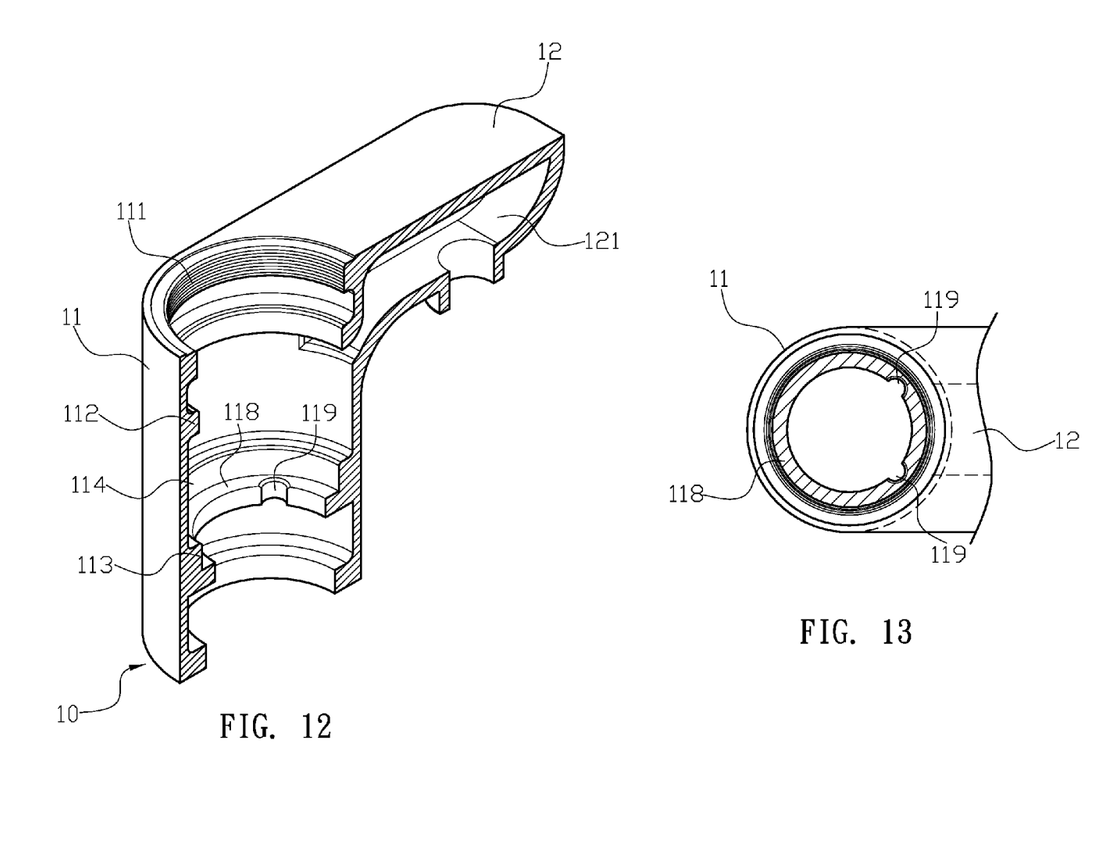
FIG. 12 is an illustration of a second embodiment of the faucet body in the present invention.
FIG. 13 is a sectional view of a second embodiment of the faucet body in the present invention.

The present invention relates to a structure of the faucet body without compartment. In this structure, the protruding shoulder (118) also can circle around the bottom of the second annular convex, and directly set up the positioning holes (119) on the protruding shoulder (118) (referring to FIG. 12 and FIG. 13).

Comparing with conventional faucet structure, the present invention is advantageous because: (i) the manufacturing process of the faucet body (10) is not required to reserve the space for compartment. With the fined ceramic valve (20) can drain water out from the side of the faucet, the outlet conduit (12) can be set on the periphery of top of shell (11). Therefore, when the faucet is used in the wash-basin or similarly reserved tanks, the problem, which is the reserved tank is hard to be clean because of the lower height of the faucet body, can be solved. (ii) Because the faucet body is no compartment, the design is not requested to have additional manufacturing process for the cold water inlet hole, the hot water inlet hole and the drain hole after the faucet body is forged or casted integrally. Thus, the design has the potential for lower processing costs and steps. (iii) With the design of protruding shoulder, which provides more contact area with the fined ceramic valve, in the faucet body, the fined ceramic valve can be set and loaded in the faucet body more steadily.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet body without compartments, said faucet body having a fined ceramic valve, which is operated by a handle, for controlling the water flow, and an upright tubular shell disposed in said faucet body, wherein an upper portion of shell comprises a thread segment, and a first annular convex and a second annular convex are formed at a lower portion of the shell below the thread segment, and a flow space is disposed between the first annular convex and the second annular convex, wherein a bottom of the second annular convex has a protruding shoulder to support and secure the faucet body, an outlet conduit laterally extends from a periphery of top of the shell and is substantially perpendicular to the fined ceramic valve, and an outlet channel is formed inside the outlet conduit to connect to the flow space of the shell so the water is able to flow through.

2. The faucet body of claim 1, wherein the faucet body is casted or forged integrally.

3. The faucet body of claim 1, wherein the fined ceramic valve comprises a valve base, bottom of which has a cold water inlet hole and a hot water inlet hole which are connected to a cold/hot inlet water conduit.

4. The faucet body of claim 3, wherein the valve base has a lower ceramic piece and an upper ceramic piece, and the upper ceramic piece is controlled by a valve stem.

5. The faucet body of claim 3, wherein a periphery of the valve base has a drain hole, and a gasket is disposed on an upper portion and lower portion of the valve body above and below the drain hole to seal with the first annular convex and the second annular convex to avoid water leaking from the upper and lower portion of the flow space.

6. The faucet body of claim 3, wherein each of a top portion of the first bearing base and the second bearing base of the faucet body has a positioning hole respectively, said a bottom portion of valve base has positioning pins to engage with the positioning holes of the bearing base to secure the fined ceramic valve in the faucet body.

7. A faucet body without compartments, said faucet body having a fined ceramic valve, which is operated by a handle, for controlling the water flow, wherein an upright tubular shell is disposed in said faucet body, and an upper portion of shell comprises a thread segment, and a first annular convex and a second annular convex are formed at a lower portion of the shell below the thread segment, and a flow space is formed between the first annular convex and the second annular convex, wherein the second annular convex has at least a first bearing base, a second bearing base and a support block which horizontally extend from a lower portion of the second annular convex, and the first bearing base, the second bearing base and the support block are connected by a protruding shoulder, and the fined ceramic valve is supported by said first bearing base, second bearing base and support block in the faucet body, wherein an outlet conduit laterally extends from a periphery of top of the shell and is substantially perpendicular to the fined ceramic valve, and an outlet channel is formed inside the outlet conduit to connect to the flow space of the shell so the water is able to flow through.

8. The faucet body of claim 7, wherein the protruding shoulder in the faucet body has a positioning hole, and the fined ceramic valve comprises a valve base, and the positioning pins of valve base engage with the positioning holes of the protruding shoulder to secure the fined ceramic valve in the faucet body.

9. The faucet body of claim 7, wherein the faucet body is casted or forged integrally.

10. The faucet body of claim 7, wherein the fined ceramic valve comprises a valve base, bottom of which has a cold water inlet hole and a hot water inlet hole which are connected to a cold/hot inlet water conduit.

11. The faucet body of claim 10, wherein the valve base has a lower ceramic piece and an upper ceramic piece, and the upper ceramic piece is controlled by a valve stem.

12. The faucet body of claim 10, wherein a periphery of the valve base has a drain hole, and a gasket is disposed on an upper portion and lower portion of the valve body above and below the drain hole to seal with the first annular convex and the second annular convex to avoid water leaking from the upper and lower portion of the flow space.

13. The faucet body of claim 10, wherein each of a top portion of the first bearing base and the second bearing base of the faucet body has a positioning hole respectively, said a bottom portion of valve base has positioning pins to engage with the positioning holes of the bearing base to secure the fined ceramic valve in the faucet body.

* * * * *